United States Patent
Uy et al.

(10) Patent No.: US 6,981,650 B2
(45) Date of Patent: Jan. 3, 2006

(54) POOL/SPA HEATER

(75) Inventors: Dindo Uy, North Hollywood, CA (US); Peter Owenson, Sonoma, CA (US)

(73) Assignee: Jandy Pool Products, Inc., Newport Beach, CA (US)

( * ) Notice: Subject to any disclaimer, the term of this patent is extended or adjusted under 35 U.S.C. 154(b) by 0 days.

(21) Appl. No.: 10/736,303

(22) Filed: Dec. 15, 2003

(65) Prior Publication Data
US 2005/0127197 A1 Jun. 16, 2005

(51) Int. Cl.
*F23N 5/24* (2006.01)

(52) U.S. Cl. .................. 236/21 B; 236/20 R; 219/519

(58) Field of Classification Search .............. 236/20 R, 236/21 R, 21 B, 32, 33, 93 R, 93 B; 219/510, 219/516, 519; 4/493; 126/561
See application file for complete search history.

(56) References Cited

U.S. PATENT DOCUMENTS

| | | | |
|---|---|---|---|
| 4,279,128 A | 7/1981 | Leniger | |
| 4,335,578 A | 6/1982 | Osborn et al. | |
| 4,361,274 A * | 11/1982 | Raleigh et al. | 236/21 B |
| 4,381,031 A | 4/1983 | Whitaker et al. | |
| 4,393,527 A | 7/1983 | Ramey | |
| 4,406,278 A | 9/1983 | Demmer | |
| 4,445,464 A | 5/1984 | Gerstmann et al. | |
| 4,733,417 A | 3/1988 | De Shon | |
| 5,117,233 A | 5/1992 | Hamos et al. | |
| 5,172,754 A | 12/1992 | Graber et al. | |
| 5,184,472 A | 2/1993 | Guilbault et al. | |
| 5,318,007 A | 6/1994 | Afshar | |
| 5,585,025 A * | 12/1996 | Idland | 219/519 |
| 5,794,280 A | 8/1998 | Hansen et al. | |
| 6,407,469 B1 * | 6/2002 | Cline et al. | 307/11 |

* cited by examiner

*Primary Examiner*—Harry B. Tanner
(74) *Attorney, Agent, or Firm*—Buchanan Ingersoll PC

(57) ABSTRACT

A pool/spa heater having a temperature control portion which is connectable to an external temperature regulating controller, in which the temperature control portion has at least one primary temperature limiting control switch with a first temperature setpoint, at least one secondary temperature limiting control switch with a second temperature setpoint, a third switch adapted for connection with the external temperature regulating controller, and wherein the second temperature setpoint is higher than a maximum temperature setting on the external temperature regulating controller but lower than the first temperature setpoint. The temperature control portion can further have an on/off switch.

6 Claims, 1 Drawing Sheet

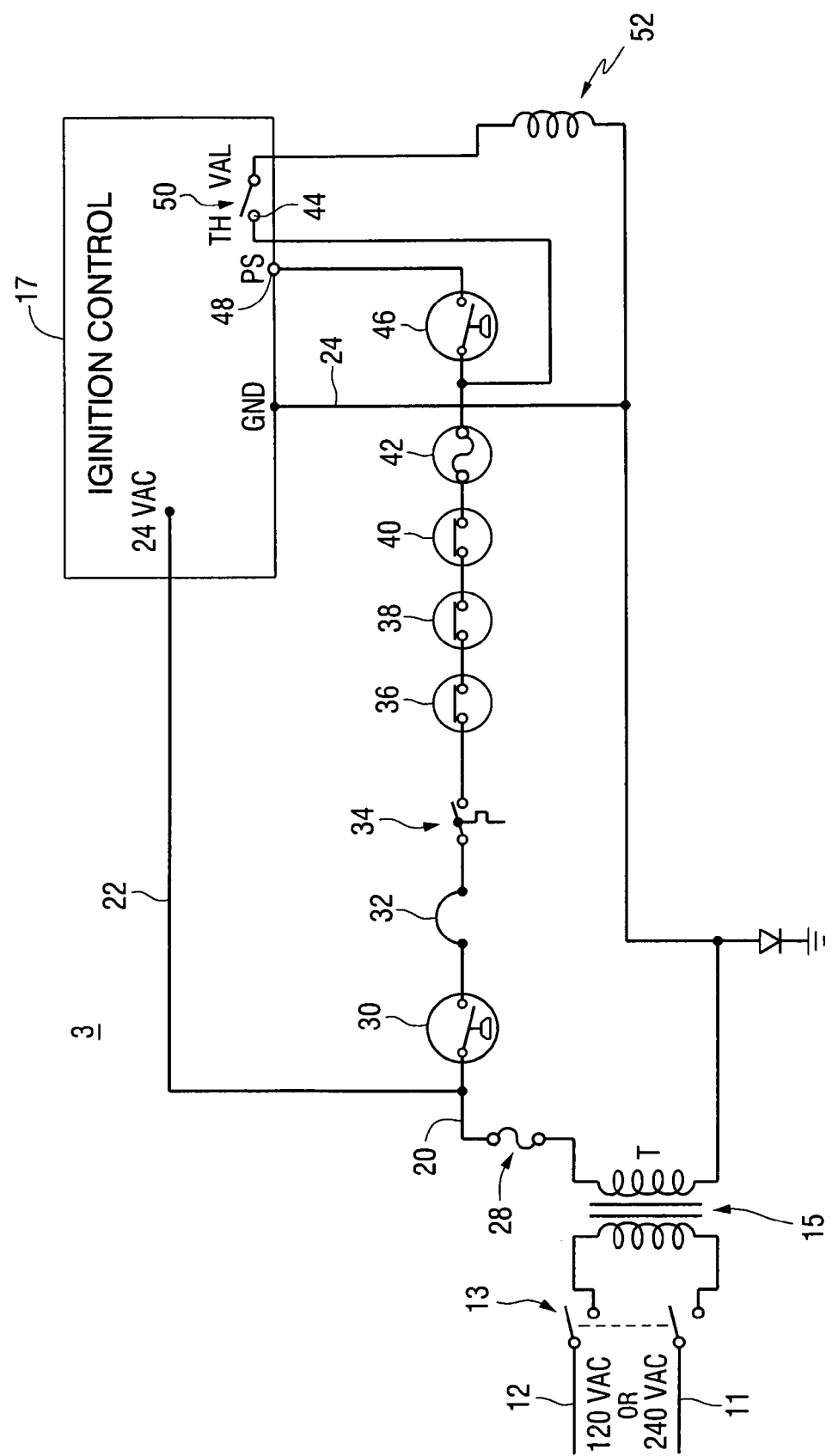

POOL/SPA HEATER

BACKGROUND OF THE INVENTION

This invention relates generally to a heater, or heat pump, for a pool or spa and, more particularly, to such a heater which does not require an integral, internal temperature regulating controller.

All conventional pool/spa heaters include an internal, integrated temperature regulating controller. This internal temperature regulating controller is provided to maintain the pool/spa water temperature at a user-selected setpoint. However, in many applications, the pool/spa heater is used in combination with a pool/spa automation controller system, which also has an integrated temperature regulating controller. When the pool/spa automation controller system is used in combination with the pool/spa heater, the temperature regulating controller of the pool/spa automation controller system will manage the temperature regulating control function for the pool or spa. In operation, the pool/spa automation controller system overrides the integrated temperature regulating controller of the pool/spa heater. Thus, when a pool/spa automation controller system is used in combination with the pool/spa heater, the integrated temperature regulating controller of the pool/spa heater is rendered redundant, and unnecessary.

In addition to the integral temperature regulating controller, conventional pool/spa heaters also typically include a number of integrated temperature limiting control switches. These temperature limiting control switches limit the highest allowable temperature of the pool/spa water in the event that the temperature regulating controller malfunctions. For example, if the water temperature should exceed a maximum temperature setpoint, the temperature limiting control switches would shut off the heater. These temperature limiting control switches are necessary to meet safety and regulatory requirements. The maximum temperature setpoint of the temperature limiting control switches is conventionally set much higher than the maximum temperature setting that can be selected via the temperature regulating controller of the pool/spa automation system.

Accordingly, it would be desirable to provide a pool/spa heater without an integrated temperature regulating controller in order to reduce the cost and manufacturing requirements conventionally associated with pool/spa heaters, where the pool/spa heater is going to be used in combination with a pool/spa automation controller system.

SUMMARY OF THE INVENTION

According to the invention, a pool/spa heater can be provided having a temperature control portion which is connectable to an external temperature regulating controller, such as a pool/spa automation controller system as described previously, in which the pool/spa automation controller system manages the water temperature regulating control functions. The pool/spa heater according to the invention is provided with a temperature control portion which does not include an integrated temperature regulating controller. However, the temperature control portion according to the invention has at least one primary temperature limiting control switch with a first temperature setpoint, and at least one secondary temperature limiting control switch with a second temperature setpoint. The second temperature setpoint is higher than a maximum temperature setting on the external temperature regulating controller but lower than the first temperature setpoint. The temperature control portion also has a third switch, such as a fireman's switch, for connecting the temperature control portion to a pool/spa automation controller system which will manage the water temperature regulating control functions. The temperature control portion also has an on/off switch.

In this manner, the pool/spa heater according to the invention avoids the need for the conventional integrated temperature regulating controller that is rendered redundant by the associated pool/spa automation controller system. Thus, the pool/spa heater according to the invention has a simplified design, and is less expensive to produce.

Other details, objects, and advantages of the invention will become apparent from the following detailed description and the accompanying drawing figure of a certain presently preferred embodiment thereof.

BRIEF DESCRIPTION OF THE DRAWING FIGURES

A more complete understanding of the invention can be obtained by considering the following detailed description in conjunction with the accompanying drawing, in which:

FIG. 1 is a schematic diagram of an embodiment of a pool/spa heater temperature control portion according to the invention.

DETAILED DESCRIPTION OF THE PREFERRED EMBODIMENTS

FIG. 1 is a schematic diagram which illustrates an embodiment of a pool/spa heater temperature control portion 3 according to the invention. As shown, power is supplied from a 120 or 240 VAC power source via wires 11 and 12. Power is applied to the unit by switching on the on/off switch 13, which can be a double pole single throw (DPST) switch, at the primary of the step-down transformer 15. On a conventional pool/spa heater, an on/off switch is not provided, and the step-down transformer would instead be hardwired directly to the power source.

Once power is applied by turning on the switch 13, the transformer 15 supplies 24VAC to the ignition control 17 via wires 20, 22 and 24. Assuming that the in-line fuse 28, water pressure switch 30, fireman switch 32, 106 degree Fahrenheit (° F.) high temperature limit switch 34, 150° F. high temperature limit switch 36, 135° F. high temperature limit switch 38, exhaust temperature switch 40, and fusible link 42 are all electrically closed, then 24VAC is also supplied to the TH terminal 44 at the ignition control 17. Once the ignition control 17 detects this voltage at the TH terminal 44, a blower fan (not shown) is activated. The blower fan causes a fan pressure switch 46 to close, thereby supplying 24VAC to the PS terminal 48 at the ignition control 17. Once the ignition control 17 detects this voltage at the PS terminal 48, an igniter (not shown) will be activated. The ignition control 17 then closes an internal switch 50 connected to the TH terminal 44, thereby supplying power to and opening a gas valve 52. Gas is now introduced to the burners (not shown) and ignited by the igniter. Once the ignition control detects the flame (by various means), the igniter is shut off.

The in-line fuse 28 is used to guard against a short circuit in the system.

The water pressure switch 30 closes only when there is water flowing through the heat exchanger. It is important to have water flowing through the heat exchanger before the burner fires, otherwise the heat exchanger will be damaged.

The fireman switch 32 is where an external temperature regulating controller, i.e., the temperature regulating controller of a pool/spa automation controller system (not shown) will be installed in series with the circuit 3. The external temperature regulating controller will be an electrically closed circuit whenever there is a call for heat, i.e., the detected actual water temperature is less than the user-selected setpoint at the external temperature regulating controller.

The 150° F. high temperature limit switch 36 and the 135° F. high temperature limit switch 38 are the primary temperature limiting control switches as used in conventional pool/spa heaters, as described previously. According to an embodiment of the invention, the 106° F. high temperature limit switch 34 is an additional, secondary temperature limiting switch that is provided as a precautionary safety measure. The fixed secondary 106° F. high temperature limit switch 34 has a setpoint which is higher than the maximum setting on the external temperature regulating controller (which is conventionally about 104° F.), but lower than the primary, 150° F. and 135° F. temperature limiting control switches 36 and 38. The fixed secondary 106° F. high temperature limit switch 34 will cause the heater to turn off sooner and at a lower temperature than it would otherwise in the event of a malfunction of the external temperature regulating controller.

The exhaust temperature 40 switch is used to guard against overheating in the burner chamber, whereas the fusible link 42 is used to guard against flame roll-out from the burner chamber.

Therefore, according to the invention, a pool/spa heater can be provided without the conventional integrated temperature regulating controller, which is typically rendered redundant by a pool/spa automation controller. Instead, a temperature control portion 3 is provided which eliminates redundant circuitry and has added features, including an additional safety measure in the form of the fixed secondary 106° F. high temperature limit switch 34, and also the on/off switch 13.

Although certain embodiments of the invention have been described in detail, it will be appreciated by those skilled in the art that various modification to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A temperature control portion for pool or spa heater which is connectable to an external temperature regulating controller, said temperature control portion comprising:
   a. at least one primary temperature limiting control switch having a first temperature setpoint;
   b. at least one secondary temperature limiting control switch having a second temperature setpoint;
   c. a third switch adapted for connection with said external temperature regulating controller; and
   d. wherein said second temperature setpoint is higher than a maximum temperature setting on said external temperature regulating controller and lower than said first temperature setpoint.

2. The temperature control portion of claim 1 further comprising an on/off switch.

3. The temperature control portion of claim 1 wherein said second temperature setpoint is about 106° F.

4. The temperature control portion of claim 1 wherein said at least one primary temperature limiting control switch further comprises first and second primary temperature limiting control switches, said first primary temperature limiting control switch having said first temperature setpoint, and said second primary temperature limiting control switch having a third temperature setpoint.

5. The temperature control portion of claim 4 wherein said first temperature setpoint is 150° F. and said third temperature setpoint is 135° F.

6. The temperature control portion of claim 5 wherein said second temperature setpoint is about 106° F.

* * * * *